US011113734B2

(12) United States Patent
Dhawan et al.

(10) Patent No.: US 11,113,734 B2
(45) Date of Patent: Sep. 7, 2021

(54) GENERATING LEADS USING INTERNET OF THINGS DEVICES AT BRICK-AND-MORTAR STORES

(71) Applicant: ADOBE INC., San Jose, CA (US)

(72) Inventors: Anmol Dhawan, Uttar Pradesh (IN); Stephane Moreau, L'Hay les Roses (FR); Sachin Soni, New Delhi (IN); Ashish Duggal, Delhi (IN)

(73) Assignee: ADOBE INC., San Jose, CA (US)

( * ) Notice: Subject to any disclaimer, the term of this patent is extended or adjusted under 35 U.S.C. 154(b) by 1083 days.

(21) Appl. No.: 14/996,174

(22) Filed: Jan. 14, 2016

(65) Prior Publication Data

US 2017/0206571 A1 Jul. 20, 2017

(51) Int. Cl.
*G06Q 30/02* (2012.01)
*G06Q 30/06* (2012.01)

(52) U.S. Cl.
CPC ..... *G06Q 30/0281* (2013.01); *G06Q 30/0201* (2013.01); *G06Q 30/0255* (2013.01); *G06Q 30/0613* (2013.01)

(58) Field of Classification Search
CPC .......... G06Q 30/0281; G06Q 30/0201; G06Q 30/0255; G06Q 30/0613
USPC ...................................................... 705/7.29
See application file for complete search history.

(56) References Cited

U.S. PATENT DOCUMENTS

| | | | | |
|---|---|---|---|---|
| 6,831,663 | B2 * | 12/2004 | Chickering | G06Q 10/02 705/5 |
| 2002/0178085 | A1 * | 11/2002 | Sorensen | G06Q 30/0201 705/7.29 |
| 2008/0159634 | A1 * | 7/2008 | Sharma | G06K 9/00771 382/224 |
| 2008/0300957 | A1 * | 12/2008 | Hirai | G06Q 30/02 705/14.41 |
| 2011/0121958 | A1 * | 5/2011 | Waller | B60K 35/00 340/438 |
| 2012/0075196 | A1 * | 3/2012 | Ashbrook | G06F 3/014 345/173 |

(Continued)

OTHER PUBLICATIONS

Smartphone Apps Guide Shoppers to In-Store Deals. Baker, Natasha. Daily Press [Newport News, Va] Jul. 7, 2013: G.13.*

(Continued)

*Primary Examiner* — Timothy Padot
(74) *Attorney, Agent, or Firm* — Shook, Hardy & Bacon L.L.P.

(57) ABSTRACT

Techniques for generating leads for consumers using IoT devices at brick-and-mortar stores are provided. A retailer can determine a consumer's level of interest in a product and provide information or other benefits to the consumer. In some embodiments, sensor data from at least one of one or more consumer devices or IoT devices are received, the sensor data being indicative of interaction of a consumer with a product. One or more interactions of the consumer with the product are determined based on the received sensor data. An interaction database is searched for an interaction mapped to specific sensor data requirements matching the received sensor data. A leads score is calculated based on the one or more interactions, the leads score indicating an interest level of the consumer in the product. When the leads score exceeds a threshold, a lead is generated for the consumer.

19 Claims, 5 Drawing Sheets

(56) References Cited

U.S. PATENT DOCUMENTS

| | | | | |
|---|---|---|---|---|
| 2012/0130774 A1* | 5/2012 | Ziv | ................. | G06Q 10/06393 |
| | | | | 705/7.39 |
| 2012/0191531 A1* | 7/2012 | You | ................... | G06Q 30/0243 |
| | | | | 705/14.42 |
| 2012/0281686 A1* | 11/2012 | Pollari | ................... | G06Q 50/01 |
| | | | | 370/338 |
| 2013/0190903 A1* | 7/2013 | Balakrishnan | ......... | A63B 71/06 |
| | | | | 700/91 |
| 2014/0324615 A1* | 10/2014 | Kulkarni | ................ | G06Q 30/02 |
| | | | | 705/26.1 |
| 2015/0206088 A1* | 7/2015 | Gouvernel | ............ | H04W 16/14 |
| | | | | 705/7.39 |
| 2015/0278867 A1* | 10/2015 | Lerman | ............... | H04W 40/244 |
| | | | | 705/14.58 |
| 2016/0110791 A1* | 4/2016 | Herring | ............. | G01G 19/4144 |
| | | | | 705/26.61 |

OTHER PUBLICATIONS

HBC keeps tabs on shoppers via in-store mobile marketing; Analytics trend. Armina Ligaya. National Post [Don Mills, Ont] Jul. 29, 2014: FP.3.*

* cited by examiner

GENERATING LEADS USING INTERNET OF THINGS DEVICES AT BRICK-AND-MORTAR STORES

BACKGROUND

Despite the popularity of online shopping, physical stores, also referred to as "brick-and-mortar" stores, continue to be a preferred shopping means for consumers. For example, according to one study, 90 percent of all retail sales are transacted in brick-and-mortar stores and 95 percent of all retail sales are captured by retailers with a brick-and-mortar presence. In addition, two-thirds of consumers use a brick-and-mortar store before or after making an online purchase, suggesting that, although the transaction is performed online, the brick-and-mortar store has an influence on the sale.

Retailers and marketers collect various information related to online transactions. For example, a retailer can collect information on the interactions a consumer has online, such as whether a consumer opens an email from the retailer, whether the consumer clicks a link in the email to visit the retailer's website, or how long a consumer spends on the retailer's website. Based on the interactions that a consumer has online, the retailer can determine whether a lead, i.e., an indicator of a consumer's interest in a product, should be generated for the consumer. The interaction information available for online transactions is generally unavailable for consumers in a brick-and-mortar store, however, even though consumers usually have multiple interactions with a product inside of a brick-and-mortar store. For example, a consumer may pick up a product, examine the product, and react to the product. The consumer may talk with a sales associate about the product and return to the product after browsing other products. These interactions would help a retailer or marketer determine how interested the consumer is in purchasing the product. However, without the means to gather and analyze consumers' interactions with products at brick-and-mortar stores, retailers or marketers miss out on the opportunity to provide information or market the products or both to consumers that have a genuine interest in the products.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are concerned with generating leads for consumers based on interactions between the consumers and products in brick-and-mortar stores. Based on the leads, a retailer or marketer can determine a consumer's level of interest in a product and provide information or other benefits to the consumer. In some embodiments described herein, sensor data is received from at least one of one or more consumer devices or IoT devices at a brick-and-mortar store. One or more interactions between the consumer and a product are determined based on the sensor data. A leads score indicating a likelihood of the consumer purchasing the product is calculated based on the one or more interactions. When the leads score exceeds a threshold, a lead for the consumer is generated.

BRIEF DESCRIPTION OF THE DRAWINGS

The present invention is described in detail below with reference to the attached drawing figures, wherein.

DETAILED DESCRIPTION

Figure 1:
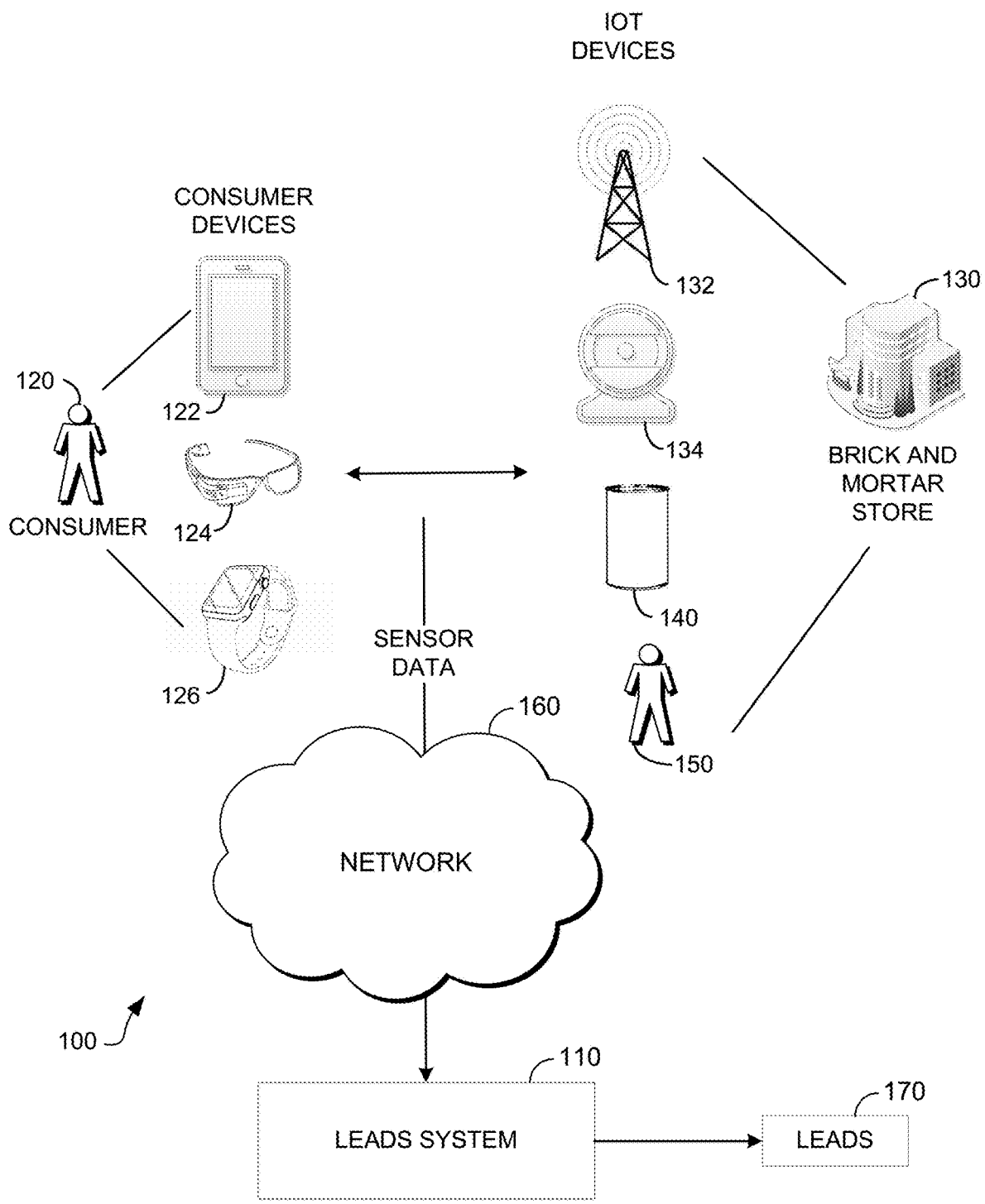
FIG. 1 is a block diagram illustrating an exemplary system for generating leads for consumers using sensor data from consumer devices or IoT devices or both at a brick-and-mortar store in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b) unless otherwise indicated to the contrary.

An "Internet of Things (IoT) device" is defined herein as a device embedded with at least one sensor and that uses a wireless communication protocol to connect to and share data from the at least one sensor with other devices. Communication can occur directly or indirectly, for example, via an IoT hub or smart device, such as a smartphone.

A "sensor" is defined herein as an object that detects events or changes in its environment. A sensor can be a component of a device, such as an IoT device, or a stand-alone object. For example, a smartphone can comprise a number of sensors, such as a timer, accelerometer, and global positioning system (GPS) sensor. A sensor can be a stand-alone object such as a radio-frequency identification (RFID) tag that can be read by an RFID reader. Many other types of sensors are also envisioned.

A "consumer" is defined herein as an entity that purchases a product or interacts with a product for the purpose of purchasing the product or does both or equivalents. A consumer is normally a human actor. A consumer makes decisions on the purchase of a product based on information available online or at a brick-and-mortar store.

A "consumer device" is a device owned by a consumer and capable of communicating with IoT devices. The communication may include, for instance, a consumer device detecting the presence of an IoT device and vice versa.

A "retailer" is defined herein as an entity that provides products for consumers to purchase. Generally, a retailer has a brick-and-mortar presence. A retailer can be a manufacturer of a product or another entity within the distribution chain of the product. For example, a grocery store receives products from a manufacturer and resells the products to consumers. Thus, a grocery store can be a retailer.

A "marketer" is defined herein as an entity that provides information on products to consumers. The information may come in the form of a coupon or alert. The marketer can collect data on consumers and use that data for marketing purposes. The marketer can be the retailer or a supplier of a product to the retailer. For purposes of this disclosure, the terms "retailer" and "marketer" are used interchangeably.

A "brick-and-mortar store" refers to a store with a physical presence containing products that allows consumers to inspect and purchase products.

A "sales associate" is defined herein as an employee of the retailer. A sales associate works at a brick-and-mortar store of the retailer. A sales associate interacts with consumers when the consumers are making purchases and otherwise assists consumers while the consumers are in the brick-and-mortar store of the retailer. A sales associate is normally a human actor.

An "interaction" comprises an activity in which a consumer interacts with a product at a brick-and-mortar store.

A "lead" is defined herein as information regarding a consumer and a product, including a quantifiable level of interest that the consumer has with the product. A "hot lead" indicates that the consumer has a strong interest in the product. The retailer can use the lead to follow up with the consumer on the product.

Traditionally, consumers visit brick-and-mortar stores to purchase products or otherwise assist in their purchasing decisions of the products. For example, a consumer may go to a brick-and-mortar store to examine the product and later on purchase the product at home (via an online store) or continue to decide on the product. While in the brick-and-mortar store, the consumer may interact with the product in different ways. For example, the consumer may pick up the product, read its label, or view a review of the product on a website.

Embodiments of the present invention are directed to generating leads for consumers and products based on interactions of the consumers with the products at brick-and-mortar stores. In accordance with embodiments, IoT devices are located in a brick-and-mortar store. When a consumer visits the brick-and-mortar store, sensor data is collected from one or more consumer devices on the consumer (e.g., smartphone, smart glasses, and smart watch) or the IoT devices or both by the retailer or marketer. In one embodiment, the sensor data is indicative of the consumer's interactions with a product. For example, a camera can track the face of the consumer or the facial expressions of the consumer or both. This data can be used to identify the consumer's interactions with a product, e.g., whether they are looking at a product. As another example, the consumer's smartphone can determine the location of the consumer near a product based on a proximity sensor on the product, the proximity of the consumer to the product being used to determine the likelihood that the consumer is interacting with the product.

The sensor data is analyzed by the retailer or marketer to determine the interactions between the consumer and an IoT device. In some embodiments, mapping information is employed that maps specific sensor data to specific interactions. Thus, some interactions may require specific sensor data to determine that the consumer has performed that specific interaction. If the received sensor data matches specific sensor data mapped to a specific interaction, that interaction is identified. For example, sensor data can be used to determine whether a consumer is interacting with a sales associate about a product. An application on a consumer's smartphone may capture a signal from a beacon attached to a product and a beacon attached to the sales associate. If the signals from the beacons of the product and sales associate indicate that the consumer is in close proximity to the product and sales associate for a predetermined time, it may be determined that the consumer is interacting with the sales associate about the product.

A leads score that indicates an interest level in a product for the consumer is determined based on the interactions between the consumer and the product. Based on the leads score, a lead can be generated for the consumer. Thus, retailers can collect and use sensor data from at least one of the consumer devices or IoT devices at brick-and-mortar stores to help follow up with the consumer.

FIG. 1 is a block diagram illustrating a system 100 for generating leads for consumers using consumer devices and IoT devices at a brick-and-mortar store 130. In the embodiment shown in FIG. 1, a consumer 120 can have multiple consumer devices, such as a smartphone 122, smart glasses 124, and a smart watch 126. In some embodiments, each of the consumer devices (e.g., the smartphone 122, smart glasses 124, smart watch 12) may have any number of different embedded sensors such as an accelerometer, gyroscope, magnetometer, proximity sensor, light sensor, GPS receiver, and camera.

The brick-and-mortar store 130 has IoT devices, such as a beacon (e.g., proximity sensor) 132 and a camera 134. The brick-and-mortar store 130 may have multiple beacons and cameras throughout the store. In some embodiments, the beacons are static beacons and are installed, for example, at entry/exit points, sales counters, or dressing rooms. The beacons 132 are used to track a consumer device (e.g., smartphone 122, smart glasses 124, or smartwatch 126) throughout the store. For example, an application on a consumer's smartphone may capture the signals from beacons located around the brick-and-mortar store, which is then used to determine the consumer's location. This enables the determination of what sections of the brick-and-mortar store 130 the consumer 120 has visited and which products have been examined. For example, the distance between the consumer and the beacon can be calculated from a Received Signal Strength Indication (RSSI). In some embodiments, an application is provided by the retailer or marketer to the consumer on a consumer device to measure and visualize the distance between the consumer and the beacon based on the RSSI. The camera 134 can record faces and perform analyses on the faces. For example, it can be determined what facial expression is being exhibited by the consumer. In some embodiments, an application is provided to the consumer to receive notifications from the brick-and-mortar store 130.

In some embodiment, a product 140 has sensors such as a beacon or proximity sensor, accelerometer, an RFID, and a camera. It should be understood that a product 140 need not have a sensor, but that a sensor is near or attached to the product 140. For example, the sensor may be on a tag attached to the product 140. The beacons are used to track the proximity of a consumer device 122 to the product 140. If the consumer picks up the product 140, the accelerometer on the product detects movement of the product 140. A product 140 may also have an RFID tag, and in such embodiments, RFID readers may be located throughout the store or provided on a consumer device. Thus, when a product 140 is moved near the RFID reader, the RFID reader can detect the RFID tag. A camera on the product may capture images (still or video) of the consumer interacting with the product 140.

In some embodiments, a sales associate 150 has sensors such as a proximity sensor and a camera. The sensor can be used to determine a proximity to the consumer 120 and the product 140. A camera on the sales associate 150 may capture images (still or video) of the consumer interacting with the sales associate 150.

It should be understood that the aforementioned descriptions are meant to be illustrative and that many other sensors can be envisioned.

Sensor data collected by the interaction between consumer device and IoT devices at the brick-and-mortar store 130 is used to determine consumer interactions with a product. For example, a proximity sensor determines when the consumer 120 is near the product 140 based on detecting a consumer device. An accelerometer detects when the consumer 120 picks up the product 140 and examines it. A camera 134 detects the consumer's reaction to the product 140. A proximity sensor can also detect when the consumer 120 and the product 140 is near a sales associate 150. The aforementioned description illustrates various sensor data that is used to determine interactions that a consumer 120 can have regarding a product. It should be understood that the description is illustrative only and is not limited to the aforementioned description. For example, a timer can determine the amount of time the consumer 120 spends with a product. It should also be understood that the sensors can work together to collect data, i.e., at least two IoT sensors collect data for a single interaction. For example, a product 140 may have an RFID tag and the smartphone 122 may have a RFID reader. The RFID tag and the RFID reader work together to collect the data from the RFID tag.

The sensor data collected by the IoT devices at the brick-and-mortar store 130 and consumer devices, such as the smartphone 122, smart glasses 126, and smart watch 126 are communicated over a communications network 160 to a leads system 110. The sensor data may be communicated directly from each IoT device or consumer device or indirectly via another device. For instance, an application on a consumer device collects the sensor data and transmits the data to the leads system via, e.g., Wi-Fi. The application can be an application provided by the retailer or by a third party. In some embodiments, a device (not shown) may be provided at the brick-and-mortar store 130 to collect sensor data from various IoT devices and communicate the collected sensor data over the network 160 to the leads system 110. It should be understood that, the means of communicating sensor data are not mutually exclusive and may comprise two or more means of communicating sensor data. For example, an application on a consumer device and an IoT device, e.g., camera, can each send sensor data to the leads system 110. As will be described in further detail below, the leads system processes the sensor data to identify leads 170.

Figure 2:
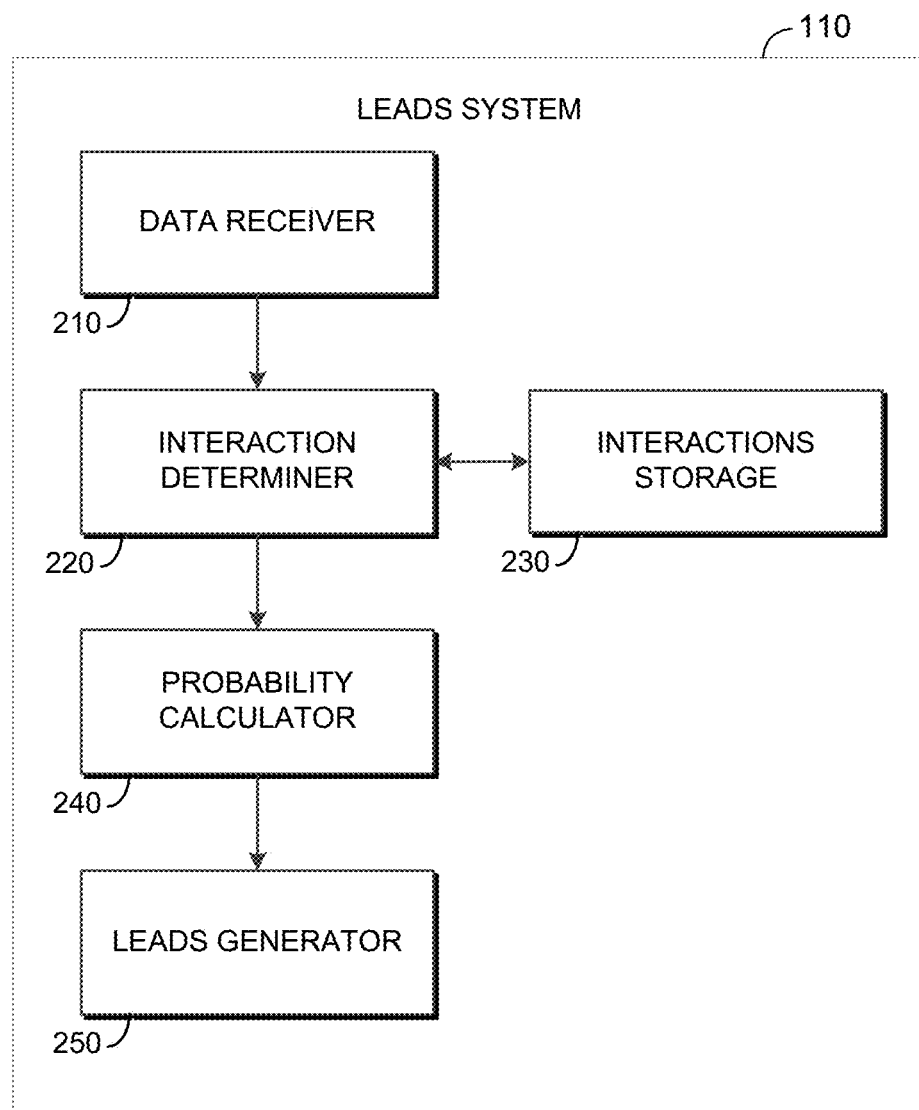
FIG. 2 is a block diagram illustrating an exemplary system for generating leads for consumers in accordance with implementations of the present disclosure.

FIG. 2 is a block diagram illustrating an exemplary leads system 110 for generating leads for consumers using sensor data collected at brick-and-mortar stores, such as the brick-and-mortar store 130 of FIG. 1. As shown in FIG. 2, the leads system 110 includes a data receiver 210, an interaction determiner 220, an interactions storage 230, a leads calculator 240, and a leads generator 250.

The data receiver 210 receives sensor data from various consumer devices and IoT devices at brick-and-mortar stores. For example, as discussed above with reference to FIG. 1, the brick-and-mortar store 130 may have a plurality of proximity sensors or cameras or both throughout the store. Each product in the store may also have sensors. Additionally, consumer devices may collect data based on interactions with the IoT devices in the brick-and-mortar store 130. These IoT devices and consumer devices send sensor data to the data receiver 210 via a network such as the network 160 of FIG. 1. In some embodiments, the leads system 110 is local to the brick-and-mortar store 130 and the sensor data may be transmitted by a short-range wireless communication protocol (e.g., Bluetooth, WiFi, Zigbee, etc.). In other embodiments, the leads system is remote from the brick-and-mortar store 130 and the sensor data is transmitted over the Internet or other network. The sensor data may include some identifier for the consumer, such as an identifier determined from the consumer devices. For example, the identifier may be a login id or an id number associated with retailer's application on the consumer device. In this manner, the sensor data can be correlated to a particular consumer to determine whether to generate a lead for the consumer as discussed in further detail below.

The interaction determiner 220 receives the sensor data from the data receiver 210 and determines corresponding interactions based on the sensor data. In some embodiments, the leads system 110 includes an interactions storage 230 that stores information mapping different sensor data to different interactions. These mappings may be configurable based on the types of interactions a marketer wishes to capture. The interaction determiner 220 can query the mapping information based on received sensor data to identify a mapping that specifies sensor data that matches at least a portion of the received data. The interaction from that mapping can then be identified as the interaction corresponding with the received sensor data. For instance, a mapping may specify that sensor data from an accelerometer on a product corresponds with an interaction of a user examining the product. As such, if the received sensor data includes product accelerometer data that corresponds with the sensor data specified by this mapping, an interaction of a user examining the product is determined by the interaction determiner 220. As another example, a mapping could specify sensor data identifying a proximity sensor on a sales associate detecting a consumer device within a certain range for a certain time period and map that sensor data to an interaction between the consumer and the sales associate. Accordingly, if the received sensor data matches this mapped sensor data, the interaction between the consumer and sales associate is identified for the received sensor data. In this way, multiple different interactions may be identified based on the received sensor data.

The leads calculator 240 generates a leads score reflecting the likelihood a consumer will purchase a product based on one or more interactions identified based on sensor data received for that consumer. In some instances, only a single interaction is identified for the consumer and the leads score is determined based on that single interaction. In other instances, multiple interactions are identified for the consumer and the leads score is determined based on those interactions.

The leads score for interactions for a particular consumer can be determined in different manners within the scope of embodiments of the present invention. In some embodiments, a machine-learned model is trained on historical information regarding interactions for each of a number of different consumers and whether a purchase was made by each of the consumers. In such embodiments, the machine-learned model is configured to take the interactions for a given consumer (e.g., identified by the interaction determiner 220) as inputs and output a leads score.

In further embodiments, a score is predetermined for each interaction and stored, for instance, with the mapping information in the interactions storage 230. In such embodiments, the leads calculator 240 determines the leads score for a consumer by retrieving the score for each interaction identified for a given consumer (e.g., by the interaction determiner 220) and combining (e.g., summing) the scores.

The score for each interaction corresponds to a degree of correlation of conversion, i.e., the likelihood the consumer will purchase the product. In embodiments, the score for each interaction is determined based on historical data regarding interactions and conversions. A standard conversion rate can be calculated based on the number of consumers that purchased the product out of the number of consumers that explored the product (i.e., had any type of interaction with the product). A high standard conversion rate indicates that consumers are likely to purchase the product after exploring the product, whereas a low standard conversion rate indicates that consumers are not likely to purchase the product after examining the product. A conversion rate corresponding to each interaction can also be calculated based on the number of consumers that perform the interaction and purchase the product out of the total number of consumers that performed the interaction. Thus, a high conversion rate corresponding to an interaction indicates that consumers that perform that interaction are more likely to purchase the product, whereas a low conversion rate corresponding to an interaction indicates that consumers that perform that interaction are less likely to purchase the product. Based on the conversion rate for an interaction, a score can be assigned to the interaction. In some embodiments, the score for an interaction is computed as a function of the conversion rate for the interaction and the standard conversion rate. Additionally, the score for each interaction can be updated at regular intervals based on additional interaction and conversion data received for consumers over time to provide the most appropriate and relevant scores for the interactions. In some embodiments, leads are generated based on the various interactions of a consumer and the corresponding score for the interaction is determined based on the number of other consumers who performed the interaction and converted in the store, i.e., conversion rate of the product, versus the number consumers who interacted with the product. It should be understood that the leads score can be any type of score, such as a probability score, that a marketer can use to determine leads.

The following algorithm and specific examples illustrate how the score of various interactions would be calculated: Initially, the percentage conversion for the product Pi is determined as follows: Percentage_Conversion_Pi=C_Pi/T_Pi where, T_Pi is the number of prospects who explored the product Pi (i.e., had an interaction of any type) and C_Pi is the number of prospects who purchased the product Pi. For every interaction Ak, the total number of prospects T_Ak who exhibited this interaction for product Pi is determined. From the set of prospects who converted for the product Pi, the number C-Ak who exhibited this interaction is determined. The percentage conversion for the interaction Ak is determined as follows: Percentage_Conversion_Ak=C_Ak/T_Ak. The score corresponding to interaction Ak is calculated as follows: S_Ak=Percentage_Conversion_Ak−Percentage_Conversion_Pi. As a result, the score of interactions whose percentage conversion is higher than the percentage conversion of the product would be higher and vice versa.

As example to illustrate, suppose 100 consumers explored a product and 10 purchased the product so that percentage conversion of the product is 10%. Regarding an interaction corresponding to watching a display for the product, suppose out of the total 100 users, 60 watched the display, and out of the 10 converted users, 9 watched the display. So the percentage conversion of display watched interaction is 15%, and the corresponding score would be 15−10=5. Regarding an interaction corresponding to sales person being called by the consumer, suppose out of the total 100 users, 20 called the sales person and out of the 10 converted users, 8 called the sales person. So the percentage conversion for sales person called interaction is 40%, and the corresponding score would be 40−10=30.

The leads generator 250 generates leads for consumers based on the leads scores determined for the consumers. In some embodiments a single threshold is used for identifying leads. When the leads score for a consumer exceeds the threshold, the leads generator 250 generates a lead for the consumer. A default threshold may be employed or a marketer may specify the threshold. In some embodiments in which leads scores are calculated based on interaction scores as discussed above, the threshold is 50. In other embodiments, multiple thresholds are employed to characterize leads that are generated based on the likelihood of conversion. For instance, a leads score above a first threshold and below a second threshold can correspond with a "warm" lead, while a leads score above the second threshold can correspond with a "hot" lead.

In some embodiments, the leads generator 250 sends the generated leads to a marketing engine (not shown). The marketing engine can in turn send marketing information to consumers regarding the product based on the leads. Each lead can include information identifying the consumer (e.g., contact information such as an email). The lead can also include information regarding the likelihood of conversion for the consumer (e.g., the leads score or an indication of the lead as being "warm" or "hot"). Other in-store contextual data can be collected and sent to the marketing engine. For example, the contextual data could include: whether the product was the first product explored; an indication of whether an application was opened on a consumer device and whether information regarding the product was accessed/viewed via the application; an indication of whether a push notification was selected; other products explored in the same section as the product; and whether a dressing room was visited.

Having described various aspects of the system for generating leads for consumers using IoT sensors 200, it is noted that any number of components may be employed to achieve the desired functionality within the scope of the present disclosure. Although the various components of FIG. 2 are shown with lines for the sake of clarity, in reality, delineating various components is not so clear, and metaphorically, the lines may more accurately be grey or fuzzy. Further, although some components of FIG. 2 are depicted as single components, the depictions are exemplary in nature and in number and are not to be construed as limiting for all implementations of the present disclosure. It should be understood that this and other arrangements described herein are set forth only as examples. Other arrangements and elements (e.g., machines, interfaces, functions, orders, and grouping of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 3:
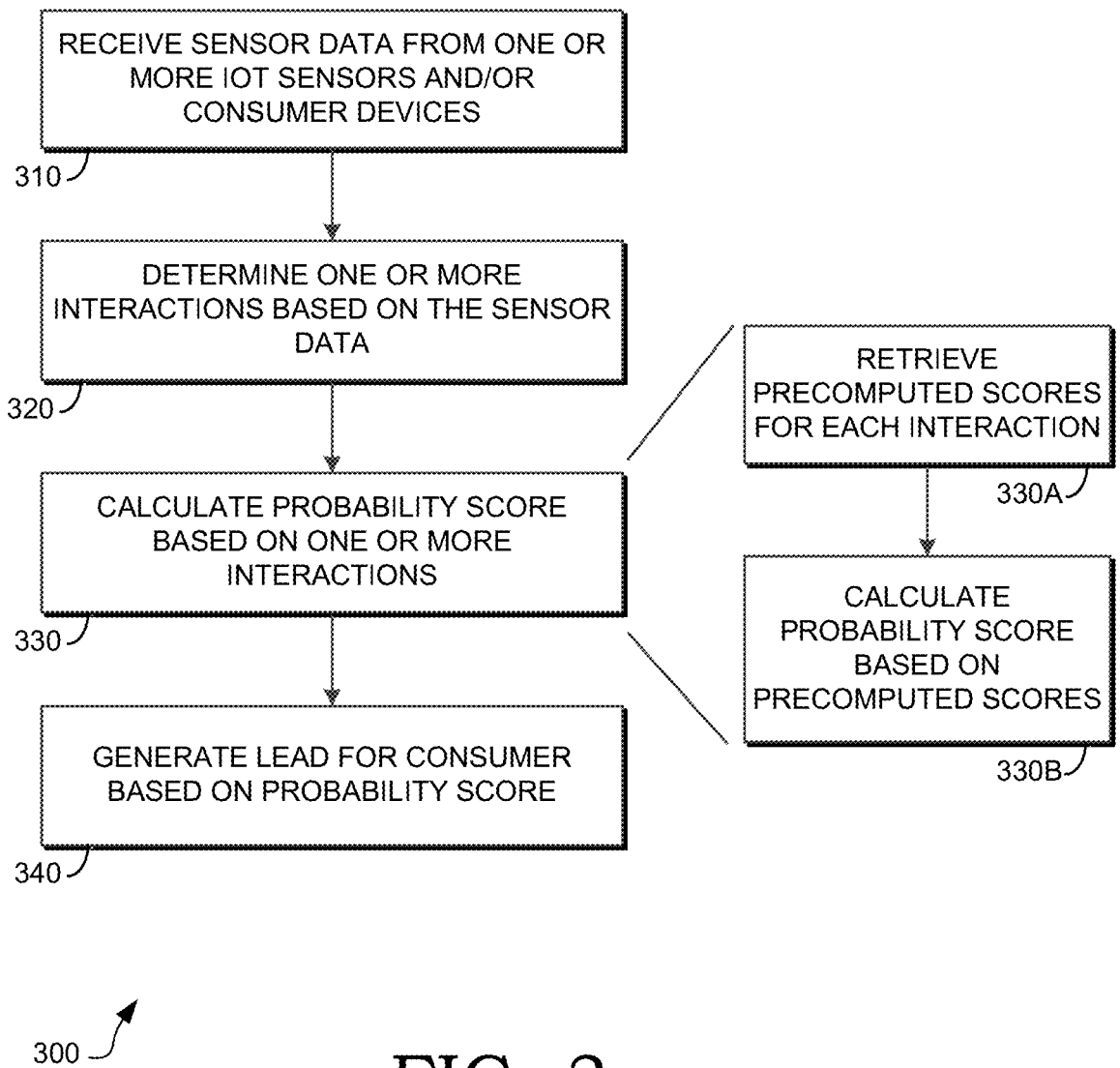
FIG. 3 is a flow diagram illustrating a method for generating leads for consumers in accordance with implementations of the present disclosure.

Turning now to FIG. 3, a method 300 for generating leads for consumers using IoT sensors is shown, in accordance with implementations of the present disclosure. Method 300 can be performed on a server at the brick-and-mortar store, or on one or more servers remote from the brick-and-mortar store (e.g., in a data center or across multiple data centers). Each block of the method 300 and other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The method 300 may be performed, for instance, by the leads system 110 of FIGS. 1 and 2.

At block 310, sensor data is received from at least one of one or more consumer device or IoT sensors at a brick-and-mortar store. In some embodiments, the sensor data is associated with a product. For example, when the sensor data is data from an accelerometer, the data is associated with the product that the accelerometer is attached to. Thus, the sensor data is indicative of some interaction between a consumer and a product.

At block 320, one or more interactions of the consumer with the product are determined based on the sensor data received from the one or more IoT sensors. In some embodiments, mapping information is provided that maps specific sensor data to specific interactions. The interactions for the consumer are determined by querying the mapping information to identify mapping(s) specifying sensor data matching the received sensor data. Accordingly, the interaction(s) from the mapping(s) are identified as the interactions for the received sensor data.

For example, if the data is from an accelerometer attached to a product, the data may indicate that the consumer is examining the product. It should be understood that not all data has a corresponding interaction. For example, if the data from the accelerometer indicates that the product has been moved downward vertically, this may indicate that the product is dropped and thus, no interaction is determined. Data from multiple IoT sensors can correspond to a single interaction. For example, movement of the product detected by an accelerometer and a camera detecting that the consumer is looking at the product can indicate that the consumer is examining the product. However, if the accelerometer detects movements of the product, but the camera detects that the user is not looking at the product, that may indicate that the consumer is not interested in the product an may have inadvertently moved the product. Also, if the consumer is looking at the product, the camera can be used to determine the interest in the product. For example, if the consumer is smiling, this may indicate a favorable opinion of the product. On the other hand, if the consumer looks angry, this may indicate a nonfavorable opinion of the product.

In some embodiments, a display associated with the product is provided in the brick-and-mortar store. The display includes sensors that send data comprising a reaction of the consumer in response to the display and an interval of time the consumer spent watching the display. When the interval exceeds a predetermined threshold, it is determined that the consumer is watching a display.

In some embodiments, sensor data associated with a sales associate is received. The sensor data comprises a proximity of the consumer to the sales associate and an interval of time the consumer spent in proximity to the sales associate. When the interval exceeds a predetermined threshold, it is determined that the consumer is interacting with the sales associate. In some embodiments, sensor data from an accelerometer in proximity with the product is received. The sensor data comprises movement of the accelerometer and an interval of time the consumer held the product. When the interval exceeds a predetermined threshold, it is determined that the consumer is examining the product. In some embodiments, the one or more IoT devices include a plurality of beacons. The received data comprises a location of the consumer over a period time. Thus, the consumer's movements can be tracked in a brick-and-mortar store. When the received data indicates that the consumer has visited a same location a number of times, it is determined that the consumer is returning to or revisiting the product. The data of the beacon comprises a universally unique identifier (UUID) to distinguish a retailer from other retailers, a major value to specify a beacon within a group, a minor value to identify a specific beacon, and a proximity value to identify a distance of the consumer to the beacon. It should be understood that the data of the beacon can comprise additional values or that the data need not comprise all of the data described above. The data of the beacon contains information to identify the beacon among other beacons.

In some embodiments, a beacon can track an individual consumer among a crowd of consumers. For example, each consumer in the crowd may be individually tracked by the beacon. In some embodiments, the beacon is a static beacon placed in the section of the brick-and-mortar store where the product is located. If the individual consumer continues to explore the product despite the presence of a crowd, e.g., the individual is present at the location of the beacon for a predetermined interval, it is determined that the consumer has an interest in the product. The determination of a crowd may be where the sensor detects the number of consumers over a predetermined number of consumers, e.g., 5.

In some embodiments, the one or more IoT devices comprise a beacon proximate to the product, where the received data indicates a proximity of the consumer to the product.

In some embodiments, an application is provided on a consumer device (e.g., smartphone, smart glasses, or smartwatch) of the consumer. The application can send notifications, e.g., push notifications, to the consumer on various products. If a consumer clicks on the notification related to the product, it is determined that the consumer has an interest in the product.

At block 330, a leads score is calculated based on the one or more interactions identified for the consumer. The leads score generally indicates an interest level of the consumer in the product or likelihood of conversion by the consumer based on the one or more interactions or both. The leads score may be calculated in a number of different ways in accordance with various embodiments. In some embodiments, precomputed scores are available for various interactions. The precomputed scores may be generated, for instance, as described below with reference to FIG. 4. Accordingly, the precomputed score for each of the one or more interactions is retrieved, as shown at block 330A. The leads score is then calculated based on the precomputed scores, as shown at block 330B. This may include, for instance, simply summing the precomputed scores but other approaches may be employed in other embodiments.

At block 340, a lead is generated for the consumer based on the leads score. In some embodiments, the lead is generated in response to determining the leads score exceeds a threshold. The lead can be used to market the product to the consumer. For example, if the leads score is above the threshold, the consumer may receive a coupon for the product or an email indicating that the product is in stock. In some embodiments, the lead is used for competing or complementary products. For example, if the product is a toothbrush, a lead can be generated for toothpaste. In some embodiments, a lead is categorized as a hot, warm, or cold lead, for instance, by using different leads score thresholds. A hot lead indicates that the consumer has a strong interest in the product and so the information can be sent to the marketing engine to follow up with the consumer regarding the product. If the lead is a warm lead, the lead is be generated but the marketing engine may not follow up with the consumer. Instead, based on further actions of the consumer, such as taking part in certain activities, the lead can become a hot lead or a cold lead. A cold lead indicates that the consumer is not interested in the product. Thus, no lead is generated. In some embodiments, the threshold(s) is/are set by the marketer.

Figure 4:
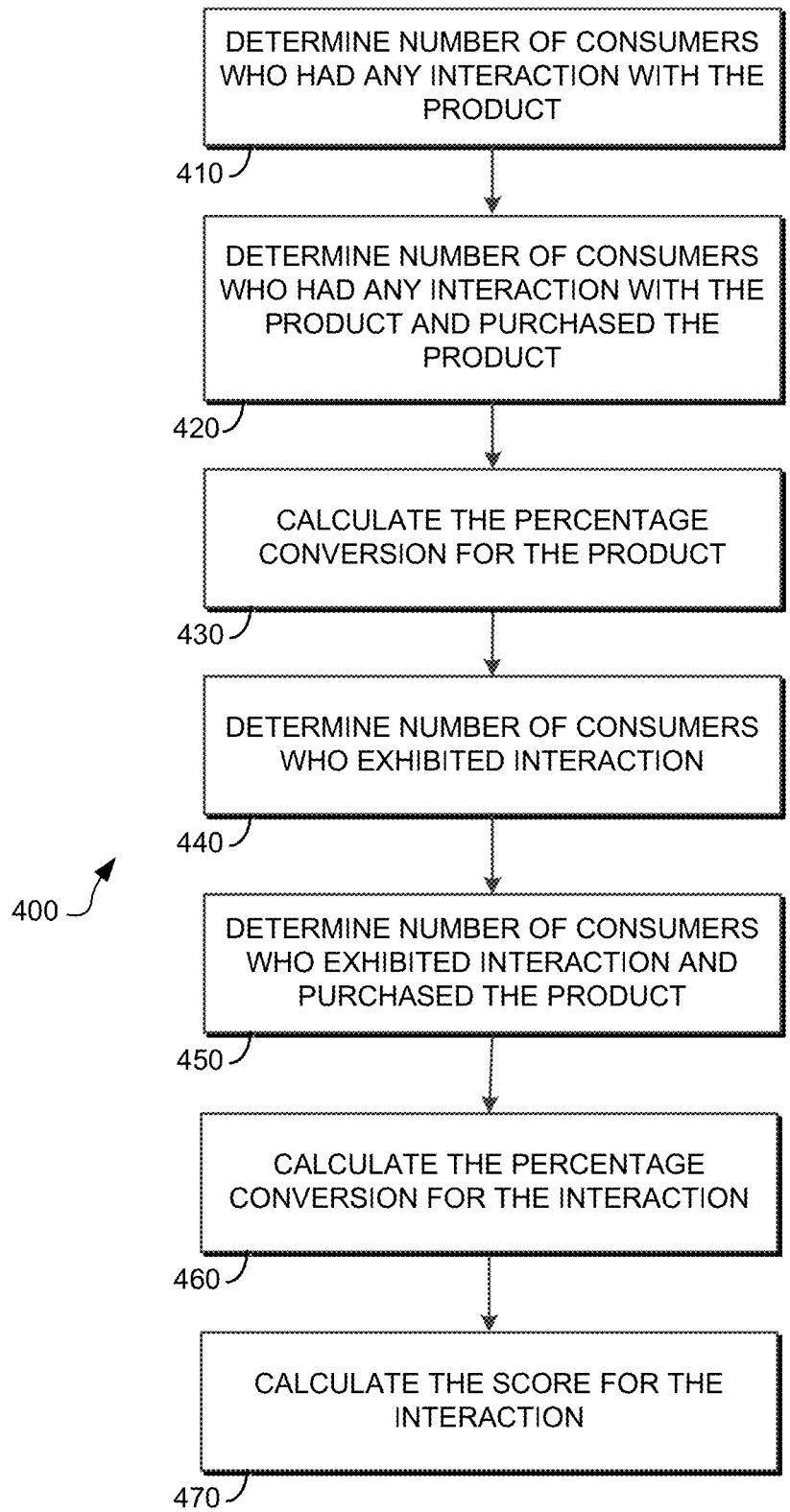
FIG. 4 is a flow diagram illustrating a method for pre-computing scores for interactions with a product in accordance with implementations of the present disclosure.

With reference now to FIG. 4, a flow diagram is provided that illustrates a method 400 for precomputing scores for interactions with a product based on historical data regarding interactions and conversions for consumers and the product. In particular, data regarding interactions between consumers and the product and whether the consumers purchased the product is collected over a period of time. The data may be collected, for instance using sensor data from consumer devices and IoT devices at brick-and-mortar stores as described hereinabove. As shown at block 410, the number of consumers who had any interaction with the product is determined from the historical data. Additionally, the number of consumers who had any interaction with the product and purchased the products is determined from the historical data, as shown at block 420. The percentage conversion for the products is determined at block 430 by dividing the number of consumers who interacted with and purchased the product by the number of consumers who interacted with the product.

As shown at block 440, the number of consumers who exhibited the particular interaction for which the score is being generated is determined from the historical data. Additionally, the number of consumers who exhibited the particular interaction and also purchased the product is determined from the historical data, as shown at block 450. The percentage conversion for the particular interaction is determined at block 460 by dividing the number of consumers who exhibited the particular interaction with and purchased the product by the number of consumers who exhibited the particular interaction. The score for the interactions is then calculated at block 470 based on the percentage conversion for the product and the percentage conversion for the interaction with the product. This may include, for instance, calculated the score by subtracting the percentage conversion for the product from the percentage conversion for the interaction with the product.

These configurations enable a retailer to analyze consumer behavior using IoT sensors to provide additional materials to consumers. By generating leads, retailers are better able to market products to interested consumers and encourage consumers to purchase the products from the retailer or other location.

Figure 5:
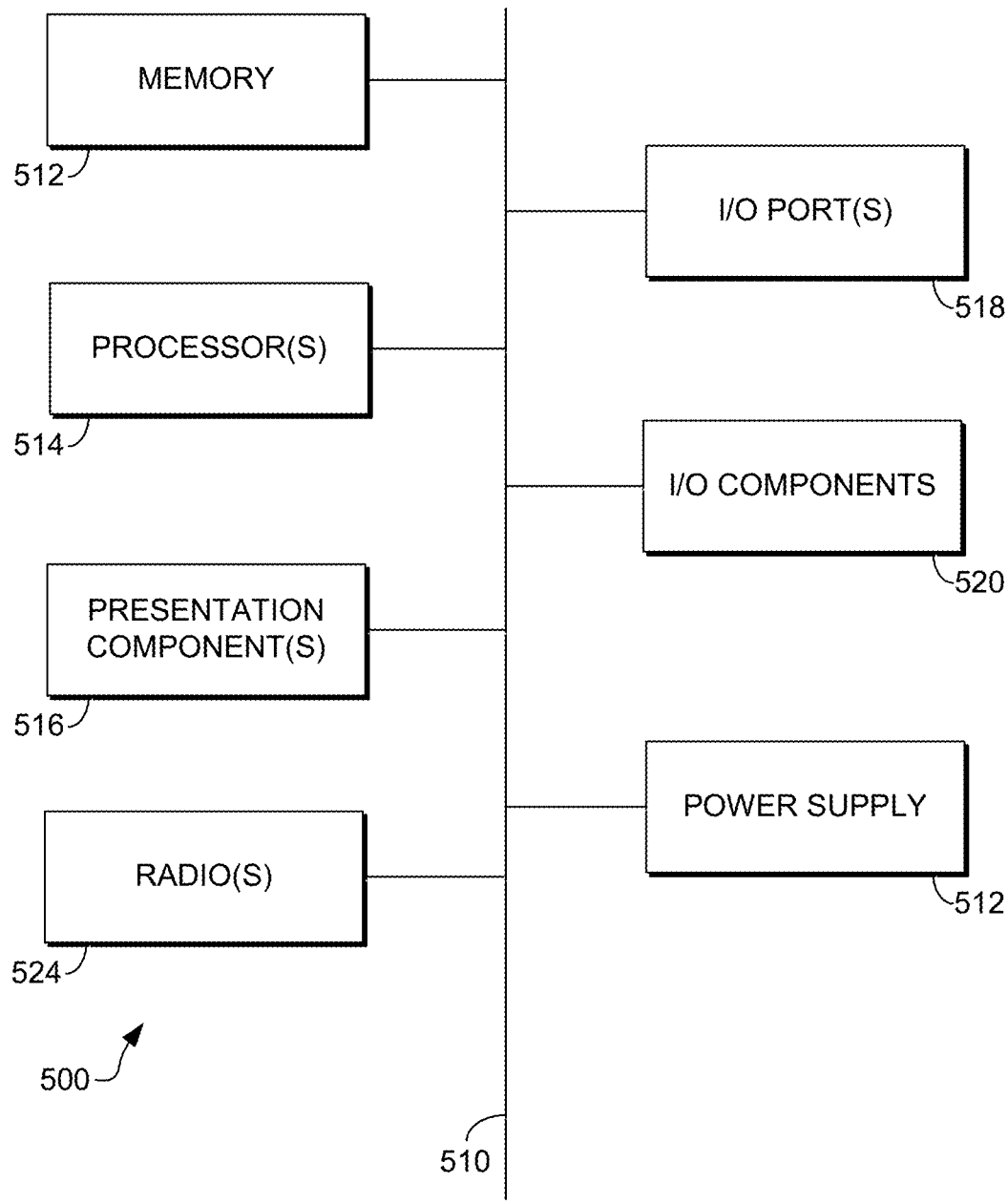
FIG. 5 is a block diagram illustrating an exemplary computing environment suitable for use in implementations of the present disclosure.

An exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

An exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component 520. Also, processors have memory. The inventors hereof recognize that such is the nature of the art, and reiterate that the diagram of FIG. 5 is merely illustrative of an exemplary computing device that can be used in connection with one or more aspects of the invention. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory 512 may be removable, nonremovable, or a combination thereof. Exemplary memory includes solid-state memory, hard drives, optical-disc drives, etc. Computing device 500 includes one or more processors 514 that read data from various entities such as bus 510, memory 512 or I/O components 520. Presentation component(s) 516 present data indications to a user or other device. Exemplary presentation components 516 include a display device, speaker, printing component, vibrating component, etc. I/O ports 518 allow computing device 500 to be logically coupled to other devices including I/O components 520, some of which may be built in.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 514 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the present invention.

A NUI processes air gestures, voice, or other physiological inputs generated by a user. Appropriate NUI inputs may be interpreted as ink strokes for presentation in association with the computing device 500. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

A computing device may include a radio. The radio transmits and receives radio communications. The computing device may be a wireless terminal adapted to received communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Accordingly, embodiments of the invention may be described in the general context of computer-executable instructions, such as program modules, being executed by a computer. Generally, program modules include routines, programs, objects, components, data structures, etc., that perform particular tasks or implement particular abstract data types. The embodiments may also be practiced in distributed computing environments or cloud environments where tasks are performed by remote-processing devices that are linked through a communications network. In a distributed computing environment, program modules may be located in both local and remote computer storage media including memory storage devices.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

Aspects of the invention have been described to be illustrative rather than restrictive. It will be understood that certain features and subcombinations are of utility and may be employed without reference to other features and subcombinations. This is contemplated by and is within the scope of the claims.

What is claimed is:

1. A computer-implemented method for generating a lead for a consumer and a product comprising:
   receiving detected sensor data from at least one of one or more consumer devices or one or more IoT devices at a brick-and-mortar store, the detected sensor data indicative of the consumer interacting with the product at the brick-and-mortar store, wherein the one or more IoT devices comprises a camera, and wherein the detected sensor data from the camera comprises an indication of a facial expression of the consumer;
   determining one or more interactions of the consumer with the product based on a comparison between the detected sensor data and stored sensor data, wherein the stored sensor data is included within mapping information, and wherein the mapping information comprises the stored sensor data that is mapped to sets of predefined interactions, each set of predefined interactions comprising a first predefined interaction and a second predefined interaction, wherein the first predefined interaction and the second predefined interaction correspond to a first precomputed score and a second precomputed score, each indicating corresponding conversion rates;
   based on the set of predefined interactions, calculating a leads score based on the first precomputed score of the first predefined interaction and the second precomputed score of the second predefined interaction, the calculated leads score indicating an interest level of the consumer in the product; and
   generating a lead for the consumer based on determining the leads score exceeds a threshold.

2. The method of claim 1, wherein the detected sensor data comprises an image or video capturing a reaction of the consumer in response to a display associated with the product and an interval of time the consumer spent watching the display, and wherein when the interval exceeds a predetermined time threshold, determining the one or more interactions of the consumer with the product comprises determining that the consumer is watching the display.

3. The method of claim 1, wherein the detected sensor data is from an IoT device associated with a sales associate indicating a distance between the consumer and the sales associate and an interval of time the consumer spent within the distance to the sales associate, and wherein when the interval exceeds a predetermined time threshold, determining the one or more interactions of the consumer with the product comprises determining that the consumer is interacting with a sales associate.

4. The method of claim 1, wherein the detected sensor data is from an accelerometer associated with the product, indicating movement of the accelerometer and an interval of time of the movement, and wherein when the interval exceeds a predetermined time threshold, determining the one or more interactions of the consumer with the product comprises determining that the consumer is examining the product.

5. The method of claim 1, wherein the one or more IoT devices comprise a plurality of beacons, wherein the detected sensor data comprises a location of the consumer over a period of time, and wherein when the received detected sensor data indicates that the consumer has visited a same location a number of times, determining the one or more interactions of the consumer with the product comprises determining that the consumer is returning to the product.

6. The method of claim 1, wherein the one or more IoT devices comprise a beacon associated with the product, wherein the detected sensor data indicates a distance between the consumer and the product.

7. The method of claim 1, wherein determining one or more interactions of the consumer with the product based on the detected sensor data comprises:
   accessing the mapping information in which a first entry defines the stored sensor data required to identify the first predefined interaction and a second entry defines the stored sensor data required to identify the second predefined interaction;
   querying the mapping information to identify the first entry and the second entry, each of whose stored sensor data matches a least a portion of the detected sensor data;
   identifying the first predefined interaction from the first entry as a first interaction of the consumer and the product, wherein the stored sensor data is mapped to the first predefined interaction; and
   identifying the second predefined interaction from the second entry as a second interaction of the consumer and the product, wherein the stored sensor data is mapped to the second predefined interaction.

8. The method of claim 1, wherein calculating the leads score comprises retrieving the first precomputed score of the first predefined interaction and the second precomputed score of the second predefined interaction and summing the first precomputed score of the first predefined interaction and the second precomputed score of the second predefined interaction.

9. The method of claim 8, wherein the precomputed score for the first predefined interaction is calculated by:
   calculating a percentage conversion for the product based on a number of consumers that purchased the product against a number of consumers that examined the product;
   calculating a percentage conversion for the first predefined interaction based on a number of consumers that exhibited the first predefined interaction with the product and purchased the product against a number of consumers that exhibited the first predefined interaction; and
   calculating the precomputed score for the first predefined interaction based on the percentage conversion for the product and the percentage conversion for the first predefined interaction.

10. The method of claim 1, wherein each set of predefined interactions further comprises receiving a plurality of marketer selected interactions, wherein the first predefined interaction and the second predefined interaction are explicitly selected for the set of predefined interactions based on a marketer selection and wherein the lead score threshold is determined on demand by the marketer.

11. The method of claim 1, wherein the determining one or more interactions with the product comprises:
   determining that the consumer is performing an interaction not previously captured;
   determining a conversion rate associated with the not previously captured interaction; and
   assigning a score to the not previously captured interaction indicating a correspondence between the interaction and a probability that the consumer will purchase the product.

12. A computer-readable storage medium storing instructions that, when executed, cause a computing device to generate leads using IoT devices at a brick-and-mortar store, the instructions comprising:

receiving detected sensor data from at least one of the IoT devices or consumer devices indicative of a consumer interacting with a product, wherein the one or more IoT devices comprises a camera, and wherein the detected sensor data from the camera comprises an indication of a facial expression of the consumer;

determining one or more interactions of the consumer with the product based on a comparison between the detected sensor data and stored sensor data, wherein the stored sensor data is included within mapping information, and wherein the mapping information comprises the stored sensor data that is mapped to sets of predefined interactions, each set of predefined interactions comprising a first predefined interaction and a second predefined interaction, wherein the first predefined interaction and the second predefined interaction correspond to a first precomputed score and a second precomputed score, each indicating corresponding conversion rates;

retrieving a precomputed score for each of the first predefined interaction and the second predefined interaction;

based on the set of predefined interactions, calculating a leads score indicating an interest level of the consumer in the product based on the first precomputed score of the first predefined interaction and the second precomputed score of the second predefined interaction;

determining that the leads score exceeds threshold; and generating a lead for the consumer and the product based on the leads score exceeding the threshold.

13. The computer-readable storage medium of claim 12, wherein the precomputed scores for each of the first predefined interaction and the second predefined interaction is calculated by:

generating a standard conversion rate by comparing a number of consumers that purchased the product against a number of consumers that explored the product;

generating an interaction conversion rate for each predefined interaction by comparing a number of consumers that exhibited each predefined interaction and purchased the product against a number of consumers that exhibited each predefined interaction;

subtracting the standard conversion rate from each predefined interaction conversion rate to obtain a precomputed score for each predefined interaction.

14. The computer-readable storage medium of claim 12, wherein the instructions further comprise re-computing the precomputed scores for each of the first predefined interaction and the second predefined interaction at a regular interval.

15. The computer-readable storage medium of claim 12, wherein at least one predetermined interaction corresponds to detected sensor data from two or more IoT devices.

16. The computer-readable storage medium of claim 12, wherein generating the leads score further comprises processing, by a machine-learned model trained on historical customer interaction information for determining the conversion rates corresponding to the first predefined interaction and the second predefined interaction.

17. A system comprising:

one or more hardware processors and memory configured to provide computer program instructions to the one or more hardware processors that, when executed by the one or more hardware processors, causes the one or more processors to perform actions comprising:

receiving detected sensor data from at least one of one or more consumer devices or one or more Internet of Things (IoT) devices at a brick-and-mortar store, wherein the one or more IoT devices comprises a camera, and wherein the detected sensor data from the camera comprises an indication of a facial expression of the consumer;

storing mapping information for sets of predefined interactions in an interactions storage, each mapping identifying stored sensor data that represents a predefined interaction, the interactions storage also configured to store a pre-computed score assigned to each predefined interaction;

determining one or more interactions with a product based on a comparison between the detected sensor data and stored sensor data, wherein the stored sensor data is included within the mapping information, and wherein the mapping information comprises the stored sensor data that is mapped to the sets of predefined interactions, each set of predefined interactions comprising a first predefined interaction and a second predefined interaction, wherein the first predefined interaction and the second predefined interaction correspond to a first precomputed score and a second precomputed score, each indicating corresponding conversion rates;

retrieving scores from the interactions storage for the first predefined interaction and the second predefined interaction identified from the detected sensor data;

based on the set of predefined interactions, calculating a leads score based on the first precomputed score of the first predefined interaction and the second precomputed score of the second predefined interaction, the calculated leads score indicating an interest level of the consumer in the product; and determining a lead for the consumer for the product based on the leads score exceeding a threshold.

18. The system of claim 17, wherein the one or more IoT devices comprise a beacon, the data of the beacon comprising:

a universally unique identifier (UUID) to distinguish a retailer from other retailers;

a major value to specify a beacon within a group;

a minor value to identify a specific beacon; and a proximity value to identify a distance of the consumer to the beacon.

19. The system of claim 18, wherein an application used by a consumer measures and visualizes the distance between the consumer and the beacon based on a Received Signal Strength Indication (RSSI).

* * * * *